Dec. 5, 1967    R. W. TAYLOR    3,356,386
UNDERSLUNG WHEEL SUSPENSION SYSTEMS
Filed Oct. 20, 1965
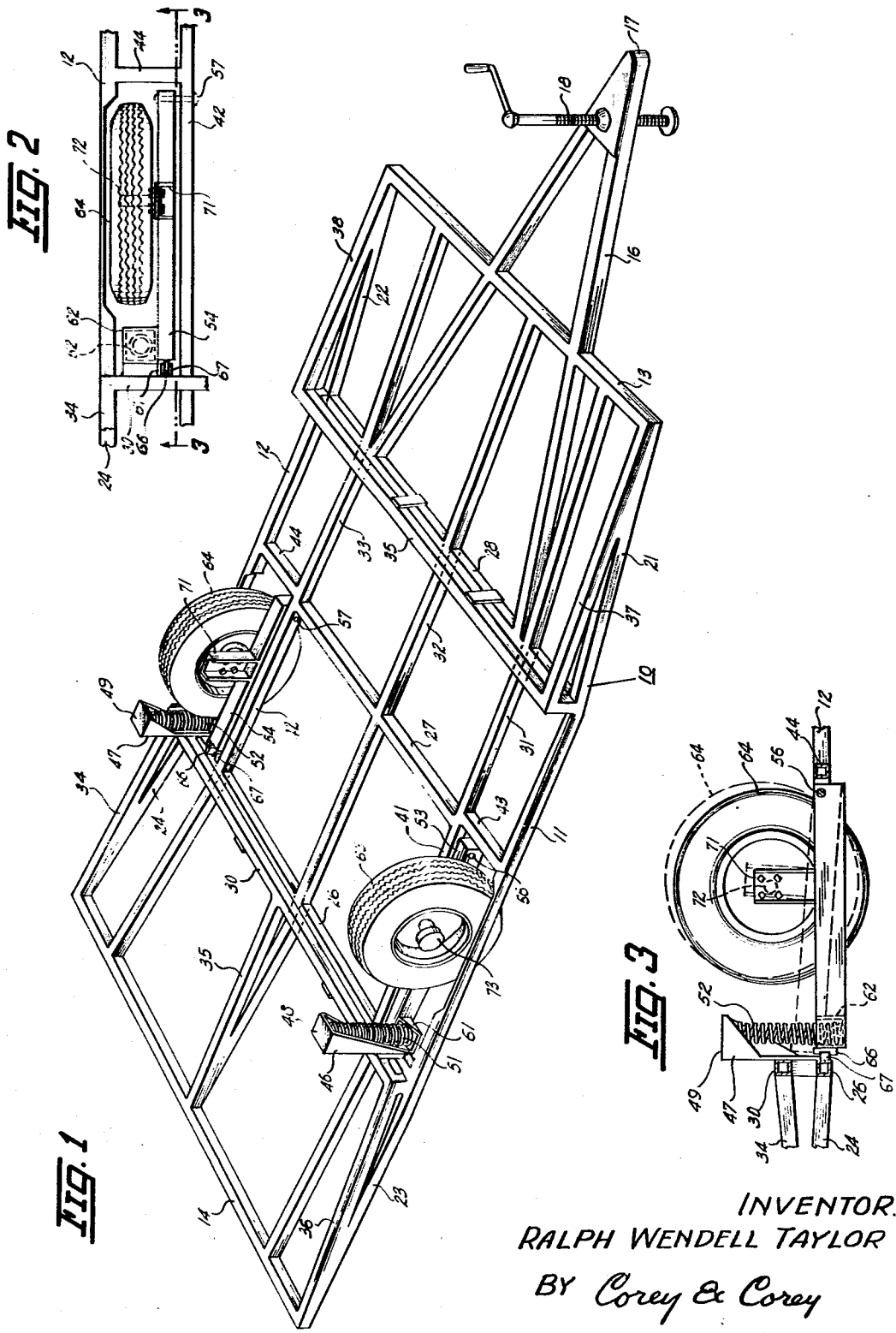
INVENTOR.
RALPH WENDELL TAYLOR
BY Corey & Corey
ATTORNEYS.

United States Patent Office 3,356,386
Patented Dec. 5, 1967

3,356,386
UNDERSLUNG WHEEL SUSPENSION SYSTEMS
Ralph Wendell Taylor, 1121 Seymour Ave.,
Iowa City, Iowa 52240
Filed Oct. 20, 1965, Ser. No. 498,707
1 Claim. (Cl. 280—106.5)

ABSTRACT OF THE DISCLOSURE

A wheel mounting for a trailer in which one end of a lever arm is pivotally engaged to the frame at its lower point and extends rearwardly into the wheel well and the free end of the lever bears against a coil spring in a spring receiver mounted on the frame at the rear of the wheel well. The wheel axle is mounted on a plate extending upward from the lever arm.

---

This invention relates to trailers and the like and has particular relation to a spring suspension system for trailers.

In trailers of all kinds and particularly in travel trailers, a low center of gravity and low profile is very desirable, but in most trailers a transverse axle is employed and vertical heighth is increased by reason of axles or spring mountings or both.

It is one of the main objects of my invention to provide a spring suspension system for trailers which will not interfere with lowest possible suspension of the trailer at minimum desirable ground clearance.

Another object of my invention is to provide a spring suspension system which may be received within the usual cabinets or the like which are lined along the walls of such trailers.

Still another object of my invention is to provide a contoured trailer underside configuration which will permit lowest possible and desirable ground clearance at the wheels or center portion of the trailer and yet permit greater clearance under the ends of the trailer.

Still another object of my invention is to provide a new and novel spring suspension system for trailers as well as a new and novel frame construction and arrangement.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of a trailer frame and spring suspension system constructed according to my invention.

FIGURE 2 is a fragmentary view of the left spring suspension shown in FIGURE 1, and FIGURE 3 is a fragmentary side elevational view taken along the line 3—3 of FIGURE 2.

Referring now to the drawings:

A rectangular trailer suspension framework, indicated at 10, employs a rectangular frame consisting of side members 11 and 12 and end members 13 and 14 with the usual A frame 16 and hitch at 17 and jack 18.

The side frame members, however, slope upwardly through the outer portions front and rear, as illustrated at 21 and 22 and 23 and 24. The side members are connected by transverse sub-frame members 26, 27 and 28, and longitudinal support members 31, 32 and 33 follow the same flat central portion and sloping end portions as the main members 11 and 12.

The platform formed by the center portions of 11, 12, 31, 32 and 33 and members 26, 27 and 28 form a level central platform portion, while other transverse members 30 and 40 are so placed above the frame members 11 and 12 so as to form with the shorter members 34, 35, 36, 37 and 38 two level platforms, one at either end of the trailer, so that the central portion of the trailer may be at a lower level than the end portions. This permits a very low rise at the center portion of the trailer from the ground to the floor level.

The longitudinal members 31 and 33 are spaced apart from the respective side members 11 and 12 sufficiently to form, with transverse member 26 and the short transverse members 43 and 44, rectangular frames or wells for the reception of the wheels. The wells on either side of the trailer frame also enclose a pair of oppositely disposed spring suspension systems which I am about to describe.

The two transverse members 26 and 30 afford mounting means or backing means for a pair of spring receivers 46 and 47. These spring receivers are preferably formed in the form of a portion of a box so that the long vertical sides of the receivers 46 and 47 may be welded to the frames 26 and 30 and the ends at 48 and 49 furnish pads against which compression springs 51 and 52 are received, the sides of the box-like members 46 and 47 helping to confine the springs.

While the resilient members 51 and 52 have been shown and described as coiled springs, obviously pads of rubber or other resilient materials may be employed without departing from the spirit and scope of the invention.

Lever arms 53 and 54 are mounted for pivotal movement by pivot pins 56 and 57 on the sides of the members 41 and 42 which are portions of members 31 and 33. The rearward or free ends of the levers 53 and 54 are provided with cups or pedestals or sockets 61 and 62 on the sides thereof for receiving the lower ends of the springs 51 and 52, and in each case the cups or perch members 61 and 62 extend outwardly behind the trailer wheels 63 and 64 so as to minimize the space necessary for the wheels and spring mountings. The extreme free ends of the levers, such as 54, terminate in a plate as at 66 which is slidingly received into vertical plates or guides 67 on a junction of members 42 and 30 to assist in guiding the free ends of the levers.

Intermediate the ends of the levers I provide upwardly extending plates as at 71 and stub axles such as 72 are secured to these plates, the stub axles extending outwardly on each side of the trailer for mounting the hubs as at 73 for the wheels and tires at 63 and 64.

The spring receivers and springs, the wheels and the levers are thus enclosed within rectangular areas of the frame, and extend upwardly therefrom without the necessity of cross axles or the like, and these members may be recieved in wheel wells which in turn are located within the cabinets and the like of the trailer.

The clearance between the frame member and the ground is regulated by the length of the plates 71 and may be at any spacing desired.

The outer portions of the frame slope upwardly so that the clearance at the ends of the frame is greater than at the center portion, so that the frame member can better pass over gutter and the like, and even if the frame should strike an obstacle, the sloping ends of the frame slide over the obstruction without damage. A very low center portion and slightly raised end portions of the floor are provided and the required height of the trailer may be sufficient for at least average individuals to stand upright in the trailer, yet the trailer is not of such height that it will not go into an ordinary garage. The frontal area of the trailer may be at a minimum to secure minimum wind resistance, and the center of gravity is extremely low for roadability.

Although I have described a specific embodiment of my invention, it is apparent that modifications thereof may be made by those skilled in the art. For instance, rubber pads or the like may be employed instead of coiled springs. Such modifications may be made without departing from the spirit and scope of my invention as set forth in the appended claims.

I claim as my invention:

In a spring suspension system for a trailer, means for mounting a wheel to secure the lowest possible frame position above the ground including a trailer main frame having a wheel well therein with one of the lowest main frame members positioned beside the wheel well, a hinge pin secured to the main frame member, a lever arm pivotally attached to the hinge pin and extending rearwardly therefrom beside the trailer frame, an upwardly extending member secured intermediate the ends of the lever arm and carrying an axle and wheel, a vertically arranged spring receiver attached to the lower frame member in the wheel well behind the wheel, and a spring in the spring receiver between the rear end of the lever and the upper end of the spring receiver.

References Cited

UNITED STATES PATENTS

| | | | |
|---|---|---|---|
| 2,077,710 | 4/1937 | Pribil | 280—106.5 |
| 2,743,955 | 5/1956 | Willson | 280—106.5 |
| 3,281,161 | 10/1966 | Anderson | 280—106 |
| 850,073 | 4/1907 | Stolp | 267—15 |

BENJAMIN HERSH, *Primary Examiner.*

PHILIP GOODMAN, *Examiner.*